United States Patent [19]
Perez

[11] Patent Number: 6,073,542
[45] Date of Patent: Jun. 13, 2000

[54] PORTABLE GAS AND ELECTRIC GRIDDLE FOR OUTDOOR-INDOOR APPLICATIONS

[76] Inventor: Primitivo Perez, 122 SE. 44th Ter., Cape Coral, Fla. 33904

[21] Appl. No.: 09/012,139

[22] Filed: Jan. 20, 1998

[51] Int. Cl.[7] ................................................... A47J 37/00
[52] U.S. Cl. .............................. 099/340; 99/422; 99/425; 99/447; 99/449; 126/39 BA; 126/41 R
[58] Field of Search .............................. 99/340, 339, 385, 99/425, 449, 447, 422; 126/39 BA, 39 G, 41 R, 275 E

[56] References Cited

U.S. PATENT DOCUMENTS

| | | |
|---|---|---|
| 3,581,731 | 6/1971 | Schulze . |
| 3,599,559 | 8/1971 | Presley . |
| 3,632,982 | 1/1972 | Linger . |
| 3,641,922 | 2/1972 | Nachazel . |
| 3,707,906 | 1/1973 | Markie . |
| 3,714,885 | 2/1973 | Wertheimer . |
| 3,722,402 | 3/1973 | Plumley . |
| 3,733,027 | 5/1973 | Napier . |
| 3,747,509 | 7/1973 | Hinkle . |
| 3,763,846 | 10/1973 | Schantz . |
| 3,789,748 | 2/1974 | Rappaport . |
| 3,815,575 | 6/1974 | Danis . |
| 3,837,270 | 9/1974 | Cooper . |
| 3,842,726 | 10/1974 | Fautz . |
| 3,895,622 | 7/1975 | Krueger . |
| 3,899,961 | 8/1975 | Tanguy . |
| 3,936,660 | 2/1976 | Blackwood . |
| 3,978,780 | 9/1976 | Vandin . |
| 3,981,233 | 9/1976 | Nagarus . |
| 3,987,719 | 10/1976 | Kean . |
| 4,002,112 | 1/1977 | Snyder . |
| 4,027,139 | 5/1977 | Theimer . |
| 4,051,347 | 9/1977 | Rohrl et al. ........................... 99/447 X |
| 4,108,141 | 8/1978 | Bauer . |
| 4,176,593 | 12/1979 | Terzian . |
| 4,245,147 | 1/1981 | Cummings . |
| 4,332,188 | 6/1982 | Rhear . |
| 4,369,763 | 1/1983 | Sullivan . |
| 4,430,559 | 2/1984 | Rabay . |

(List continued on next page.)

FOREIGN PATENT DOCUMENTS 0197905  10/1986  European Pat. Off. ................. 99/422

*Primary Examiner*—Reginald L. Alexander

[57] ABSTRACT

This invention presents dual functions in a sole appliance. The present griddle has the feature to be heated by gas or electricity. This makes the griddle portable. The griddle comprising of housing (1) and a plurality of supporting legs (7*a, b, c, d*)(not shown) and attached to said housing (1) a removable top plate fixture (2), and attached to the interior of the housing (1) a separator plate (15) covering the entire interior area of the housing (1)characterized in that the housing (1) contains an electrical heating device (16), and electrical socket (9) and a gas manifold (17) with connector locking valve (3) the housing contains thermal insulation (21).

14 Claims, 3 Drawing Sheets

U.S. PATENT DOCUMENTS

| | | |
|---|---|---|
| 4,446,846 | 5/1984 | Hahn . |
| 4,488,479 | 12/1984 | Soloan . |
| 4,495,861 | 1/1985 | Jacks . |
| 4,516,486 | 5/1985 | Burkhart . |
| 4,539,973 | 9/1985 | Hait . |
| 4,541,406 | 9/1985 | Dasamblagio . |
| 4,566,429 | 1/1986 | Williams . |
| 4,586,428 | 5/1986 | Adamson . |
| 4,598,634 | 7/1986 | Van Horn . |
| 4,607,608 | 8/1986 | Allred . |
| 4,607,609 | 8/1986 | Kegling . |
| 4,633,772 | 1/1987 | Bowden . |
| 4,635,538 | 1/1987 | Polster . |
| 4,653,391 | 3/1987 | Shimizu . |
| 4,666,727 | 5/1987 | Wang . |
| 4,669,373 | 6/1987 | Weiner . |
| 4,700,619 | 10/1987 | Scanlon . |
| 4,702,159 | 10/1987 | Polster . |
| 4,724,823 | 2/1988 | Simpson . |
| 4,768,427 | 9/1988 | Cheng . |
| 4,798,132 | 1/1989 | Chang . |
| 4,800,865 | 1/1989 | Seltzer . |
| 4,845,893 | 7/1989 | Racine . |
| 4,878,424 | 11/1990 | Adamson . |
| 4,919,110 | 4/1990 | Yocoyama . |
| 4,926,843 | 5/1990 | Vogke . |
| 4,957,096 | 9/1990 | Yocoyaman . |
| 5,062,408 | 11/1991 | Smith . |
| 5,067,396 | 11/1991 | Sorensen . |
| 5,070,775 | 12/1991 | Blake . |
| 5,078,050 | 1/1992 | Smith . |
| 5,105,726 | 4/1992 | Lisker . |
| 5,133,248 | 7/1992 | Farnsworth . |
| 5,155,318 | 10/1992 | Bowen . |
| 5,163,358 | 11/1992 | Hanagan . |
| 5,197,379 | 3/1993 | Leonard . |
| 5,198,491 | 3/1993 | Honda . |
| 5,227,597 | 7/1993 | Dickens . |
| 5,280,749 | 1/1994 | Smith . |
| 5,345,923 | 9/1994 | Luebke . |
| 5,351,608 | 10/1994 | Muchin . |
| 5,357,850 | 10/1994 | Codurier . |
| 5,365,832 | 11/1994 | Gaydoul . |
| 5,404,808 | 4/1995 | Smith . |
| 5,413,032 | 5/1995 | Bruno . |
| 5,440,973 | 8/1995 | Welhouse . |
| 5,455,102 | 10/1995 | Tsai . |
| 5,465,654 | 11/1995 | Lambi . |
| 5,467,695 | 11/1995 | Keller . |
| 5,490,452 | 2/1996 | Schlossck . |
| 5,507,220 | 4/1996 | Kwang . |
| 5,511,466 | 4/1996 | Dzibinski . |
| 5,522,308 | 6/1996 | Kayashima . |
| 5,524,610 | 6/1996 | Clark ................................ 126/41 R X |
| 5,542,347 | 8/1996 | Williams . |
| 5,544,569 | 8/1996 | Langhammer . |
| 5,553,531 | 9/1996 | Brown . |
| 5,558,008 | 9/1996 | Jenkins . |
| 5,592,871 | 1/1997 | Bertlet . |
| 5,611,264 | 3/1997 | Studer ........................................ 99/340 |
| 5,619,910 | 4/1997 | Farnsworth et al. ...................... 99/422 |
| 5,628,426 | 5/1997 | Doile . |
| 5,644,976 | 7/1997 | Muchin . |
| 5,647,271 | 7/1997 | Capelle . |
| 5,676,043 | 10/1997 | Best . |
| 6,392,697 | 2/1995 | Anderson et al. ......................... 99/340 |

PORTABLE GAS AND ELECTRIC GRIDDLE FOR OUTDOOR-INDOOR APPLICATIONS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of Invention

This invention relates to cookware, specifically to such griddle which are portable and operable by several different means of heating elements.

2. Description of Prior Art

There are endless methods in which people cook food today. The cookware have used ranges from a conventional kitchen stove to an ultra modern microwave oven. In between, there are many gadgets which are introduced to make cooking better. In this particular case, this is what is claimed. There are many cooking apparatus patented which are intended to be used for indoor only. For Example, U.S. Pat. No. 1,090,924 discloses an electric cooking apparatus that obviously can not be used on any application where there is no electricity available, or in an outdoor environment. Portability is not intended for this cooking apparatus. U.S. Pat. No. 1,690,570 deals with a similar cooking apparatus. This patent discloses an indoor electrically operated broiler. The limitations on this apparatus are the same as those mentioned in the former patents. U.S. Pat. No. 2,156,557 deals with an electrically heated grill on which the inherent defect have already been mentioned. An obvious aspect of all these patents is the lack of portability, or the lack of heating by means others than electricity. U.S. Pat. No. 4,724,823 discloses a griddle heated by gas means. This cooking apparatus is not able to be used outdoor-indoor, because to be heated indoors it is required special requirements are made. For instance, adequate means shall be provided to properly ventilate the space in which this apparatus is installed. Exhaust fans are used to ventilate the place where the appliance will be installed. Adequate air supply for the right gas combustion is also required. Thus, portability is not intended in this cooking apparatus, and in all patents used as reference in my application. Obviously, the lack of portability and one source of heating mean are the inherent defects in all those references.

BRIEF SUMMARY OF THE INVENTION

Objects and Advantages

In addition, besides the objects and advantages of having a portable, multi-heated elements griddle described and proposed in the patent application, several objects and advantages of the present invention are:

(a) to provide convenience to user where griddle can either use gas or electricity for operation.

(b) to provide convenience to user to have a cooking apparatus to use it at home or in recreational areas.

(c) to provide to user the way to cook different types of food outdoor-indoor.

(d) to provide an easy and clean method to cook.

Further objects and advantages will become apparent from a consideration of the ensuing description and drawings.

Summary Ramification, and Scope

Accordingly, the reader will see that the portable multi heat source griddle can be operated with the ease of any ordinary cooking device. Furthermore, the portable griddle has the additional advantages of:

provides portability in cooking food in any ambient conditions offers the advantages of having two heat sources for cooking; it allows for the use of either gas or electricity to be used as the fuel needed to cook food rugged body shell gives it a tough exterior to protect it from exterior conditions Although the description above contains many specificities, these should not be construed as limiting the scope of the invention but as providing illustration of a preferred embodiment of this invention. For example, the rectangular shape of the portable griddle can be altered to a circular shape or any other shape, the function will still remain the same.

Thus the scope of the invention should be determined by the appended claims and their legal equivalents, rather than by the example given.

BRIEF DESCRIPTION OF THE SEVERAL VIEWS OF THE DRAWING OF THE INVENTION

Drawing Figures

In the drawings, the present invention at hand is disclosed for pictorial refence.

Figure 1:
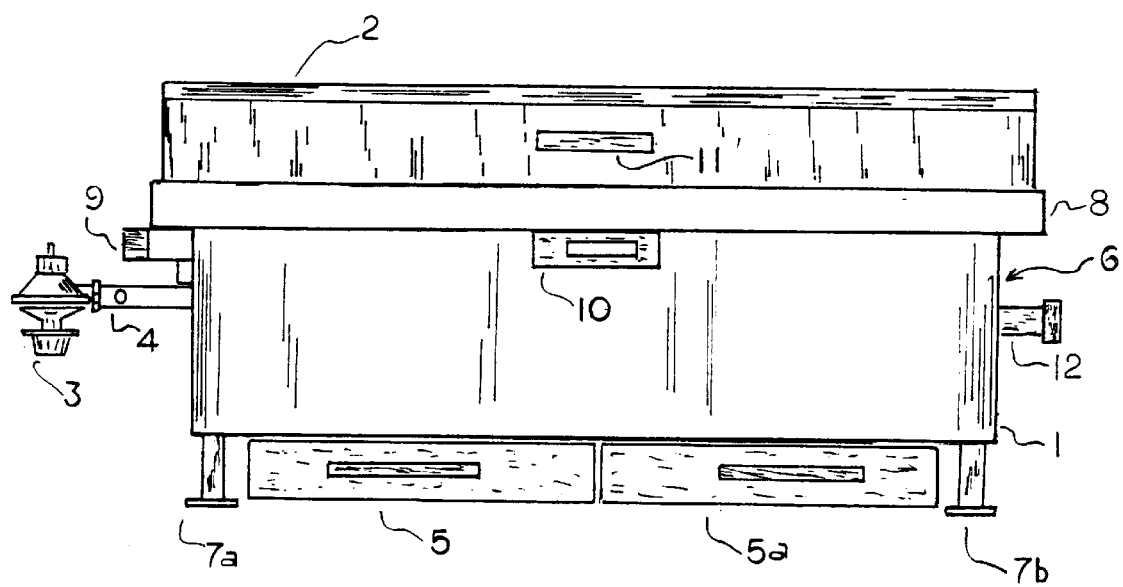
FIG. 1 shows a side view of the dual heating element portable griddle where the gas valve and electrical socket are shown.

REFERENCE NUMERALS IN DRAWINGS 1 griddle body or housing
2 griddle cover
3 gas regulator (locking valve)
4 locking valve connection
5 optional pan
5a optional pan
6 view of the griddle mechanism
7 legs a, b, c, d (not shown)
8 liquids drainer channel
9 electrical socket
10 liquid pan collector
11 cover handle
11a cover handle 12 external housing handle
14 electrical connector control
15 griddle plate (partition)
16 electrical resistance
17 gas manifold
19 drainer orifice
19a drainer orifice
20 vent ports
21 thermal insulation board
22 sectional view reference
23 ceramic support attachment bar
24 sectional view of the disposition of the electrical resistance
25 sectional view of the disposition of the gas manifold
26 sectional view of the disposition of the ceramic supports
27 enlarged view of the insulation material used in the thermal insulation board
28 cover hinge

DETAILED DESCRIPTION OF THE INVENTION

Description—FIGS. 1 to 4

Figure 2:
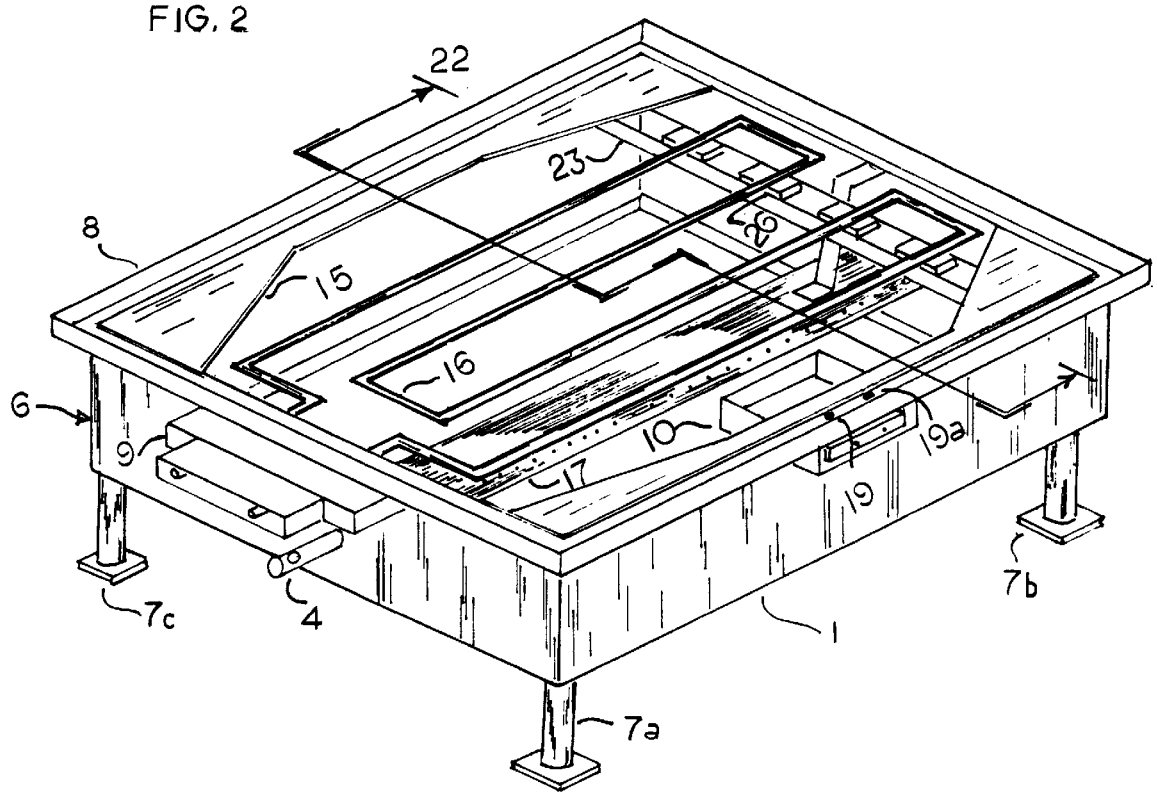
FIG. 2 shows an isometric view of the griddle mechanism where interior members of the griddle are shown.
Figure 3:
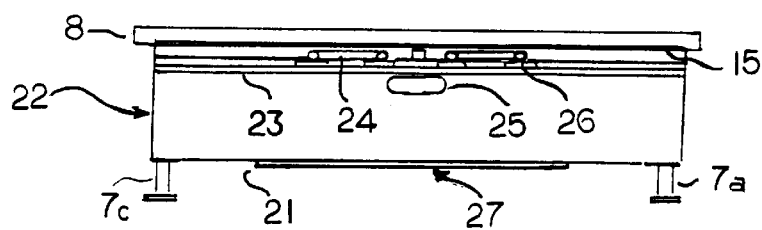
FIG. 3 shows a sectional view from FIG. 2 reference 22 displaying the disposition of the heating means under the griddle plate (partition).
Figure 4:
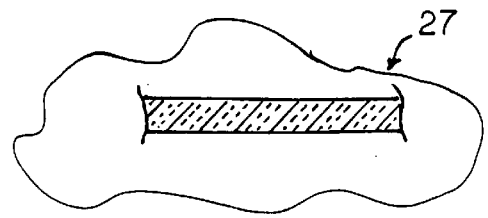
FIG. 4 shows an enlarged view of the insulation material used in the thermal insulation board.
Figure 5:
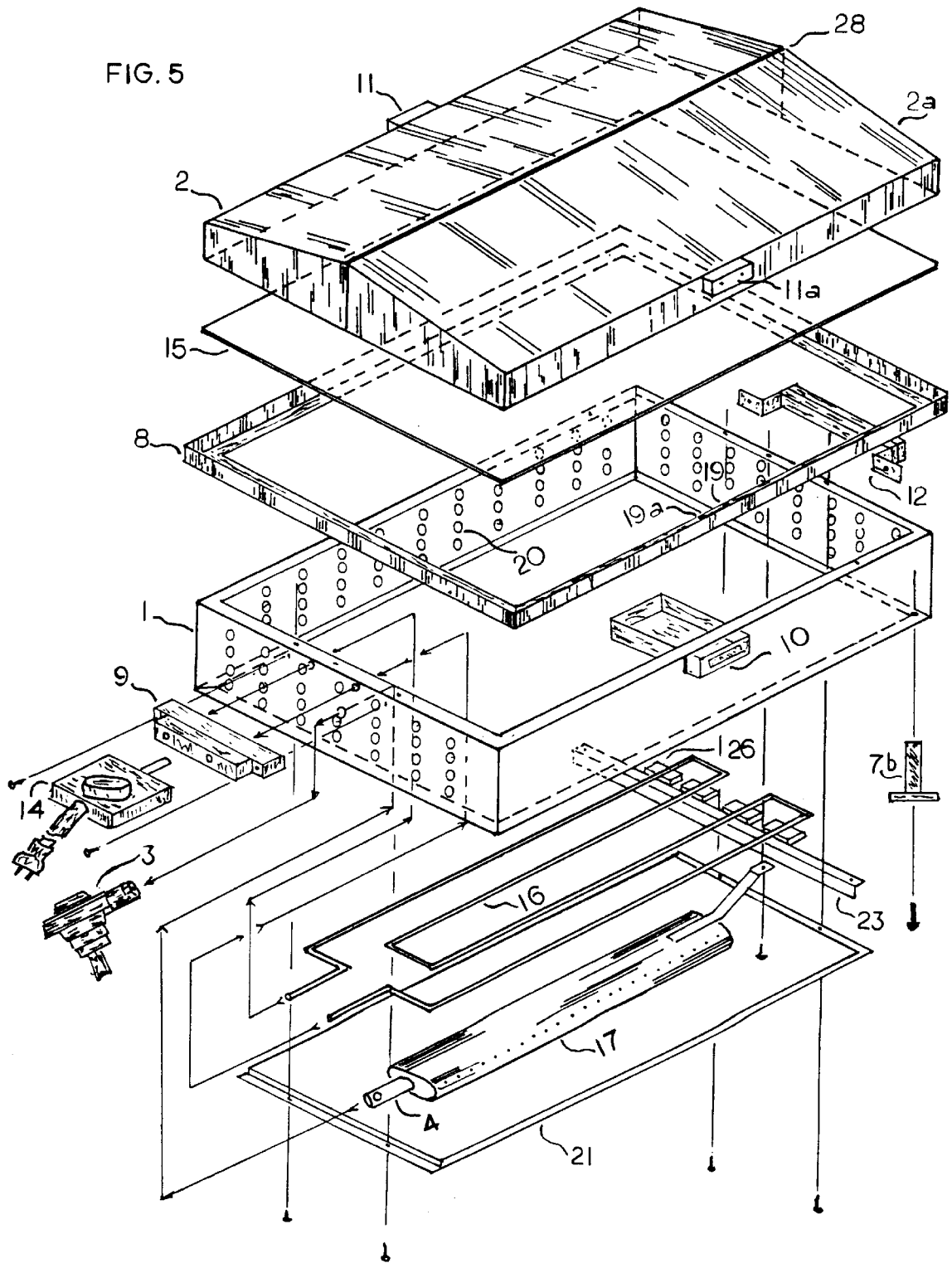
FIG. 5 shows an exploded isometric view displaying all parts comprising the present griddle.

A typical embodiment of the portable griddle of the present invention is illustrated in FIG. 1 (side view) and FIG. 2 (isometric view) the side view reveals handle 11 for the cover plate 2. The liquids drainer channel 8. The side view also shows the gas regulator valve 3 connected to the locking gas valve connector 4. The electrical socket 9 is connected to the outer wall of the griddle body 1. The grease and liquid collector pan 10 is showed in this view. To the other side of the griddle, opposed to the gas control valve 3 is attached the external housing handle 12. The griddle stands are showed 7a and 7b. Below the griddle body 1 are displayed two optional drawers 5 and 5a. The isometric view FIG. 2 shows a detailed disposition of the internal part of the griddle of a transparent view through the plate 15. This view shows the electrical resistance 16 as a first element under the plate 15 connected to the electrical socket 9 on one of its ends and by the ceramic supports 26 on its other end. The gas manifold 17 is showed right below of the electrical resistance 16. FIG. 3 deals with a sectional view from reference 22. This view shows the disposition of the griddle heating elements: electrical resistance 24, ceramic supports 26, ceramic supports attachment bar 23, gas manifold 25. Also, the thermal insulation board 21 position is showed. FIG. 4 shows an enlarged view of the insulation material 27 used in the thermal insulation board 21. FIG. 5 deals with a detailed exploded perspective view of all the related parts of the present griddle embodiment. The electrical control 14, the vent ports 20, and the cover hinge 28 are showed in this figure which were not shown before.

From description above a number of advantages of portable multiple heat source griddle become evident:

(a) The use of either gas or electricity makes it ideal for indoor-outdoor use.
(b) Get two appliance in one.
(c) The portability of the griddle increases its usefulness.

Operation—FIGS. 1, 2, 3, 4, 5

The manner of using the portable griddle is the same as using any other cookware which is used for cooking food. For cooking outdoors, the griddle will be connected to a gas container through a line gas adapter, and the gas pressure regulator valve 3. As the gas enters the gas manifold 17, one may ignite the gas causing a heating effect on the cooking plate 15. The heat may be controlled by the gas control valve 3 which is designed for low, medium and high. The cover is useful to reuse the heat that is coming from the griddle plate 15, and to protect what is being cooked from dust and others elements from the environment. The vent ports 20 are placed on the griddle body 1 to help the gas combustion, for elimination of excess heat, and to prevent overheating of the griddle body 1.

For cooking indoors, the griddle will be connected to any household electric outlet plugging the electric control 14 into the electric socket 9. Operating the electric control, the electric power will heat the electrical resistance 16. The heat will be transferred to the griddle plate by thermal conduction.

I claim:

1. A portable griddle comprising:

(a) a housing; and
    said housing having at least one external grasping member;
(b) a plurality of vent ports permeating vertical walls of said housing;
(c) a plurality of independent support members being mounted under said housing said support members being substantially small for supporting said portable griddle upon a counter top or a table;
(d) at least one heat limitation member attached to center portion of said housing bottom opening;
(e) at least one liquid gathering container mounted to interior wall of said housing;
(f) at least one liquid depleting member with depletive portion mounted over perimeter of said housing and having marginal portion upwardly bent and extending upwardly to greater elevation of the cooking area for evacuating grease and liquids emitted by food on top of said cooking area; and
    said at least one liquid depleting member having at least one depletive opening placed directly over said at least one liquid gathering container; and
(g) at least one cooking food sustainer mounted onto said at least one liquid depleting member said at least one cooking food sustainer perimeter bordering contiguous to said at least one depleting member depletive portion forming a partition with respect to interior of said housing and said cooking area said partition restrains the liquids emitted by food to fall to interior of said housing for avoiding toxic smoke when cooking indoors; and
(h) means for individually heating said at least one cooking food sustainer, wherein said means for individually heating said at least one cooking food sustainer having a first electrical heating means for heating said at least one cooking food sustainer when cooking outdoors and a second gas heating means for heating said at least one cooking food sustainer when cooking indoors;
(i) at least one attachment device placed to interior of said housing;
(j) a griddle lid with at least one articulate mechanism mounted at mid width thereof said lid mounts onto said at least one cooking food sustainer; and
    said lid having a plurality of grasping members placed symmetrically on each of said lid portion for manipulating said lid with no risk of burn when user is cooking, whereby the improvement includes a combination of all these elements for making present griddle portable and for cooking anywhere, and whereby users can cook outdoors or indoors with present griddle without a need of having two appliances or any special requirement and with a clean method for cooking.

2. The portable griddle of claim 1 wherein said vent port are placed in about all said housing wall, whereby said vent ports allow the interchange of oxygen and monoxide in the combustion process and for dissipating excess of heat from said griddle housing.

3. The portable griddle of claim 1 wherein said at least one cooking food sustainer being a flat uniform metal member, whereby the flatness of said at least one food sustainer substantially allows to eliminate grease and liquids thereof.

4. The portable griddle of claim 1 wherein said at least one heat limitation member comprising of a matrix of metal layers and an insulating membrane placed thereinto, whereby said at least one heat limitation member substantially restrains loss of heat emitted by said means for individually heating said at least one cooking food sustainer.

5. The portable griddle of claim 1 wherein said means for heating said at least one cooking food sustainer directly placed thereunder, whereby said heating means heat said at least one food sustainer with one heating device at a time.

6. The portable griddle of claim 1 wherein said at least one attachment device transversely rod placed with respect to said means for individually heating said at least one cooking food sustainer for supporting one of said heating means contiguous thereof.

7. The portable griddle of claim 1 wherein said at least one liquid gathering container drawer shaped for easy removal from wall interior.

8. A portable griddle comprising:
   (a) a griddle body; and
   said griddle body having at least one external handle member;
   (b) a plurality of ventilation holes permeating vertical walls of said griddle body;
   (c) a plurality of independent supporting legs being mounted under said griddle body said independent supporting legs being substantially small for supporting said portable griddle upon a counter top or a table;
   (d) at least one thermal insulation member attached to center portion of said griddle body bottom opening;
   (e) at least one liquid collector container mounted to interior wall of said griddle body;
   (f) at least one liquid drainer channel with drainage portion mounted over perimeter of said griddle body and having marginal portion upwardly bent and extending upwardly to greater elevation of the cooking area, for evacuating grease and liquids emitted by food on top of said cooling area; and
   said at least one liquid drainer channel having at least one drainage orifice placed directly over said at least one liquid collector container;
   (g) at least one griddle plate member mounted onto said at least one liquid drainer channel said at least one griddle plate perimeter bordering contiguous to said at least one drainer channel drainage portion forming a partition with respect to interior of said griddle body and said cooking area said partition restrains the liquids emitted by food to fall to interior of said griddle body for avoiding toxic smoke when cooking indoors; and
   (h) means for individually heating said at least one griddle plate, wherein said means for individually heating said at least one griddle plate having a first electrical heating means for heating said at least one griddle plate when cooking outdoors and a second gas heating means for heating said at least one griddle plate when cooking indoors;
   (i) at least one affixing member placed to interior of said griddle body;
   (j) a griddle cover with at least one hinged mechanism mounted at mid width thereof said cover mounts onto said at least one griddle plate member; and
   said griddle cover having a plurality of handles placed symmetrically on each of said griddle cover portion for manipulating said cover with no risk of burn when user is cooking,
   whereby the improvement includes a combination of all these elements for making present griddle portable and for cooking anywhere, and
   whereby users can cook outdoors or indoors with present griddle without a need of having two appliances or any special requirement and with a clean method for cooking.

9. The portable griddle of claim 8 wherein said ventilation holes are placed in about all said griddle body wall, whereby said ventilation holes allow the interchange of oxygen and monoxide in the combustion process and for dissipating excess of heat from said griddle body.

10. The portable griddle of claim 8 wherein said at least one griddle plate member being a flat uniform metal sheet, whereby the flatness of said at least one griddle plate allows to eliminate grease and liquids thereof.

11. The portable griddle of claim 8 wherein said at least one thermal insulation device comprising of a matrix of metal layers and an insulating membrane placed thereinto, whereby said at least one thermal insulation substantially restrains loss of heat emitted by said means for individually heating said at least one griddle plate.

12. The portable griddle of claim 8 wherein said means for heating said at least one griddle plate directly placed thereunder, whereby said heating means heat said at least one griddle plate with one heating device at a time.

13. The portable griddle of claim 8 wherein said at least one affixing member transversely rod placed with respect to said means for individually heating said at least one griddle plate for supporting one of said heating means contiguous thereof.

14. The portable griddle of claim 8 wherein said at least one liquid collector container drawer shaped for easy removal from wall interior.

* * * * *